(12) United States Patent
Murison et al.

(10) Patent No.: US 7,738,166 B2
(45) Date of Patent: Jun. 15, 2010

(54) FIBER AMPLIFIER WITH INTEGRATED FIBER LASER PUMP

(75) Inventors: Richard Murison, St-Lazare (CA);
Tullio Panarello, St-Lazare (CA);
Benoit Reid, Laval (CA); Reynald Boula-Picard, Montreal (CA)

(73) Assignee: PyroPhotonics Lasers, Inc., Quebec (CA)

( * ) Notice: Subject to any disclaimer, the term of this patent is extended or adjusted under 35 U.S.C. 154(b) by 196 days.

(21) Appl. No.: 11/942,984

(22) Filed: Nov. 20, 2007

(65) Prior Publication Data

US 2008/0130102 A1    Jun. 5, 2008

Related U.S. Application Data

(60) Provisional application No. 60/866,808, filed on Nov. 21, 2006.

(51) Int. Cl.
*H04B 10/17* (2006.01)
*H01S 3/30* (2006.01)

(52) U.S. Cl. .......................... 359/341.3; 372/6
(58) Field of Classification Search ............. 359/341.3; 372/6
See application file for complete search history.

(56) References Cited

U.S. PATENT DOCUMENTS

| | | | |
|---|---|---|---|
| 5,710,786 A | | 1/1998 | Mackechnie |
| 5,867,305 A * | | 2/1999 | Waarts et al. ........... 359/337.12 |
| 6,020,991 A * | | 2/2000 | Yoshinori et al. ......... 359/341.1 |
| 6,191,854 B1 * | | 2/2001 | Grasso et al. ............... 356/341 |
| 6,301,272 B1 * | | 10/2001 | Koch et al. ...................... 372/6 |
| 6,353,499 B2 * | | 3/2002 | Zanoni et al. ........... 359/341.32 |
| 6,407,855 B1 | | 6/2002 | MacCormack et al. |
| 6,567,580 B2 | | 5/2003 | Bacher et al. |
| 6,646,785 B2 * | | 11/2003 | Kuksenkov .................. 359/334 |
| 6,901,190 B1 | | 5/2005 | Nagel |
| 2002/0149839 A1 | | 10/2002 | Hamoir |
| 2004/0075886 A1 | | 4/2004 | Brasseur et al. |
| 2006/0126163 A1 | | 6/2006 | Gomes et al. |
| 2009/0046352 A1 * | | 2/2009 | Brunet et al. ................ 359/333 |

OTHER PUBLICATIONS

International Search Report and Written Opinion of PCT Application No. PCT/CA2007/02103, dated Feb. 25, 2008, 12 pages total.

* cited by examiner

*Primary Examiner*—Eric Bolda
(74) *Attorney, Agent, or Firm*—Townsend and Townsend and Crew, LLP

(57) ABSTRACT

An optical system adapted to amplify an input signal includes an optical pump supporting the input signal and an optical pump beam. The optical pump includes an input port, a first active medium coupled to the input port, and a pump output coupled to the first active medium. The optical amplifier includes an amplifier input optically coupled to the pump output and adapted to receive the input signal after passing through the optical pump, a second active medium coupled to the amplifier input, and an amplifier output adapted to output the amplified input signal.

25 Claims, 3 Drawing Sheets

FIBER AMPLIFIER WITH INTEGRATED FIBER LASER PUMP

CROSS-REFERENCES TO RELATED APPLICATIONS

The present application claims benefit under 35 U.S.C. §119(e) of U.S. Provisional Patent Application No. 60/866,808, filed Nov. 21, 2006, entitled "Fiber Amplifier with Integrated Fiber Laser Pump," the disclosure of which is incorporated herein by reference in its entirety.

BACKGROUND OF THE INVENTION

The present invention relates generally to the field of optical amplifiers and lasers. More particularly, the present invention relates to methods and systems including optically excited rare-earth doped optical fiber gain media. Merely by way of example, the methods and systems have been applied to the integration of a fiber laser pump with a fiber amplifier. But it would be recognized that the invention has a much broader range of applicability and can be applied to other sources.

Conventional laser-based material processing has generally used high peak power pulsed lasers, for example, Q-switched Nd:YAG lasers operating at 1064 nm, for marking, engraving, micro-machining, and cutting applications. More recently, laser systems based on fiber gain media have been developed. In some of these fiber-based laser systems, fiber amplifiers are utilized.

Some optical amplifiers and lasers utilizing a fiber gain medium are optically pumped, often by using semiconductor lasers pumps. The fiber gain medium is typically made of silica glass doped with rare-earth elements. The choice of the rare-earth elements and the composition of the fiber gain medium depends on the particular application. One such rare-earth element is ytterbium, which is used for optical amplifiers and lasers emitting in the 1020 nm-1100 nm range. Another rare-earth element used in some fiber gain media is erbium, which is used for optical amplifiers and lasers emitting in the 1530 nm-1560 nm range.

The wavelength of the optical pump source used for ytterbium-doped fiber amplifiers and lasers is typically in the wavelength range of 910 nm to 980 nm. The wavelength of the optical pump source used for erbium-doped fiber amplifiers and lasers is typically in a wavelength range centered at about 980 nm or about 1480 nm. When ytterbium-doped or erbium-doped fiber amplifiers are pumped at the above mentioned wavelengths, they generally have significant gain and amplified spontaneous emission (ASE) outside of the wavelength range of interest, i.e., the lasing or amplification wavelength. For example, when an ytterbium-doped fiber gain medium is pumped at a wavelength of about 915 nm, it can generate high gain and amplified spontaneous emission at about 976 nm; when it is pumped at a wavelength of around 976 nm, it can generate high gain and ASE at about 1030 nm. In the case of erbium-doped fiber, pumping at wavelengths of 980 nm or 1480 nm can generate high gain and ASE at around 1530 nm.

As a result of the out-of-band gain, i.e., the gain present outside the wavelength range of interest, it is possible for the amplifiers or the lasers to produce ASE or start lasing at these out-of-band wavelengths. Such ASE or lasing will limit the amount of gain available at the wavelength of interest. In some amplifier applications, large out-of-band ASE will limit the available gain and the ASE power may be larger than the signal power at the wavelength of interest. Thus, there is a need in the art for improved methods and systems for pumping fiber-based amplifiers.

SUMMARY OF THE INVENTION

According to the present invention, techniques related generally to the field of optical amplifiers and lasers are provided. More particularly, the present invention relates to methods and systems including optically excited rare-earth doped optical fiber gain media. Merely by way of example, the methods and systems have been applied to the integration of a fiber laser pump with a fiber amplifier. But it would be recognized that the invention has a much broader range of applicability and can be applied to other sources.

According to an embodiment of the present invention, an optical system adapted to amplify an input signal is provided. The optical system includes an optical pump supporting the input signal and an optical pump beam. The optical pump includes an input port, a first active medium coupled to the input port, and a pump output coupled to the first active medium. The optical amplifier includes an amplifier input optically coupled to the pump output and adapted to receive the input signal after passing through the optical pump, a second active medium coupled to the amplifier input, and an amplifier output adapted to output the amplified input signal.

According to another embodiment of the present invention, a method of amplifying an input signal is provided. The method includes providing an input signal at a signal wavelength and providing a first pump beam at a first pump wavelength. The method also includes coupling the input signal and the pump signal to an input port of an optical pump, passing the input signal through the optical pump, and generating a second pump beam at a second pump wavelength. The method further includes coupling the passed input signal and the second pump beam to an input port of an optical amplifier and amplifying the passed input signal using the optical amplifier.

According to an embodiment of the present invention, an optical amplifier is provided. The amplifier includes a first length of rare-earth-doped fiber delimited by reflection means and a second length of rare-earth-doped fiber with a first port optically coupled to a first port of the first length of rare-earth-doped fiber. The amplifier also includes an optical pump light, which is injected into the first length of rare-earth-doped fiber. The optical signal being amplified is injected into a second port of the first length of rare-earth-doped fiber and exits at a second port of the second length of rare-earth-doped fiber. The optical pump is made powerful enough to induce lasing into the first length of rare-earth-doped fiber, which in turn optically pumps the second length of rare-earth-doped fiber.

According to another embodiment of the present invention, an optical amplifier is provided. The amplifier includes a first length of rare-earth-doped fiber delimited by reflection means and a second length of rare-earth-doped fiber with a first port optically coupled to a first port of the first length of rare-earth-doped fiber. The amplifier also includes an optical pump light, which is injected into the first length of rare-earth-doped fiber. The optical signal being amplified is injected into a second port of the second length of rare-earth-doped fiber and exits at a second port of the first length of rare-earth-doped fiber. The optical pump is made powerful enough to induce lasing into the first length of rare-earth-doped fiber, which in turn optically pumps the second length of rare-earth-doped fiber.

According to yet another embodiment of the present invention, an optical amplifier is provided. The amplifier includes a first length of rare-earth-doped fiber delimited by reflection means and a second length of rare-earth-doped fiber with a first port optically coupled to a first port of the first length of rare-earth-doped fiber. The amplifier also includes and optical isolator between the first length and the second length of rare-earth-doped fibers. The amplifier further includes an optical pump light, which is injected into the first length of rare-earth-doped fiber. The optical signal being amplified is injected into a second port of the first length of rare-earth-doped fiber and exits at a second port of the second length of rare-earth-doped fiber. The optical pump is made powerful enough to induce lasing into the first length of rare-earth-doped fiber, which in turn optically pumps the second length of rare-earth-doped fiber.

Numerous benefits are achieved using the present invention over conventional techniques. For example, in an embodiment according to the present invention, high pump power can be efficiently injected in the core of fiber amplifiers. Moreover, in embodiments of the present invention simple, compact, and cheap high-power core-pumped fiber amplifiers can be obtained. Depending upon the embodiment, one or more of these benefits may exist. These and other benefits have been described throughout the present specification and more particularly below. Various additional objects, features and advantages of the present invention can be more fully appreciated with reference to the detailed description and accompanying drawings that follow.

DETAILED DESCRIPTION OF SPECIFIC EMBODIMENTS

Figure 1:
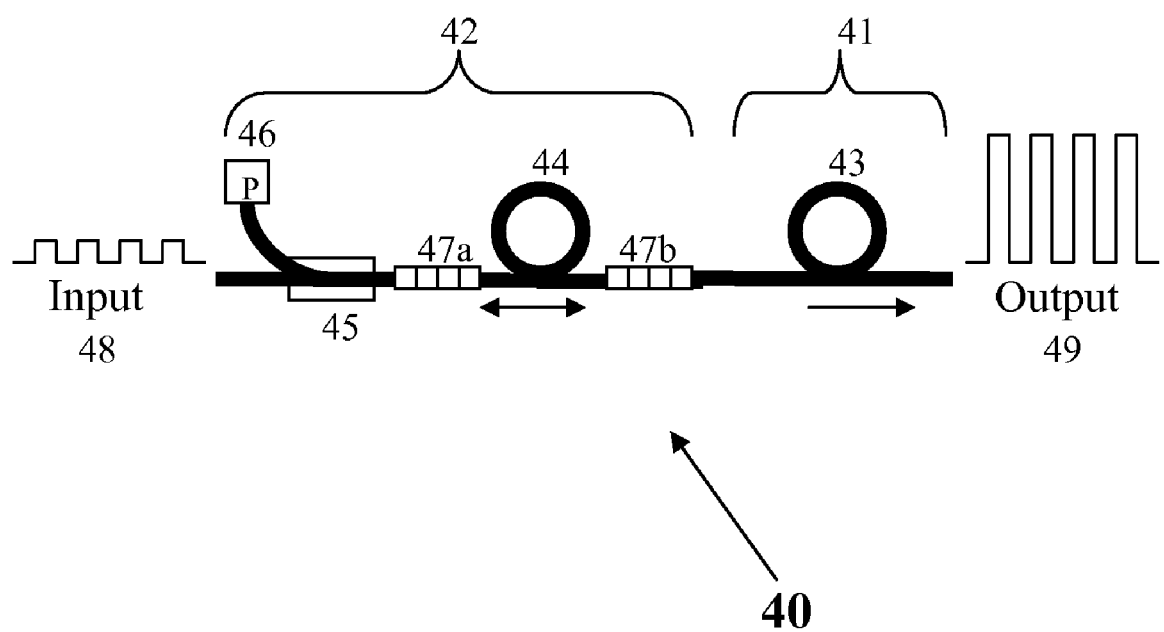
FIG. 1 is a simplified schematic diagram of an amplifier with integrated pump laser according to an embodiment of the present invention.

According to the present invention, techniques related generally to the field of optical amplifiers and lasers are provided. More particularly, the present invention relates to methods and systems including optically excited rare-earth doped optical fiber gain media. Merely by way of example, the methods and systems have been applied to the integration of a fiber laser pump with a fiber amplifier. But it would be recognized that the invention has a much broader range of applicability and can be applied to other sources.

Using a Ytterbium-doped fiber amplifier pumped in the 910 nm-980 nm wavelength band for 1064 nm operation can be prone to spurious lasing at around 1032 nm due to very high gain at that wavelength. Optically pumping the amplifier at around 1032 nm instead of the 910 nm-980 nm band can effectively minimize spurious lasing and noise for 1064 nm pulse amplification. Accordingly, one of the challenges of producing a fiber amplifier is in finding a suitable pump source. In many cases, the preferred pump source is a semiconductor laser. Semiconductor lasers fall into two general categories, single-mode and multi-mode lasers. Single-mode lasers have two primary advantages over their multi-mode counterparts.

First, they can be readily stabilised using Fiber Bragg Gratings (FBGs) such that their wavelengths are confined within a relatively narrow spectral band, and are relatively insensitive to temperature variations. Second, the output of a single-mode laser can be launched very efficiently into a single-mode fiber, which cannot be accomplished with a multi-mode laser. These advantages make single-mode lasers ideal for pumping fiber amplifiers, but unfortunately they are severely limited in the power levels at which they can be operated. As of 2005, the highest power commercially available single-mode fiber-coupled lasers can be operated in the region of 0.5 W, whereas many emerging applications require pump sources delivering several watts of pump power.

Multi-mode semiconductor lasers can be used to pump optical amplifiers designed using double-clad fiber. This fiber design confines the signal to a small inner, typically, but not limited to, single-mode core, and the pump power to an outer multi-mode core (also called the inner clad), which also serves as the cladding for the inner core. The pump power is usually guided into the inner clad by the refractive index step with the outer clad. Typically the core and the inner clad are made with glass and the outer clad is made with a polymer coating having a refractive index lower than the glass. In other types of double-clad fibers, the outer clad is also made with glass having a lower refractive index than the inner clad. In single-clad fibers on the contrary, the polymer coating has a higher refractive index than the glass, thereby preventing the multimode pump from being guided and propagating. As is known in the art, a double-clad fiber can be used in a single-clad configuration if the pump and the signal are propagating in the fiber core. Therefore according to embodiments of the present invention, single-clad fibers are understood to include double-clad fibers used in a single-clad configuration.

Because the multi-mode pump core can be large, the output of a multi-mode semiconductor laser can be efficiently launched into it. These double-clad fibers can make high-performance fiber amplifiers and fiber lasers, but require extremely high absorption rates within the core in order to be effective, because the pump energy in the clad has a small overlap with the core. For instance, a double clad fiber design having a core diameter of 30 µm, a cladding diameter of 250 µm, and a relatively high Ytterbium concentration of $3 \times 10^{25}$ ions per $m^3$, will have a pump absorption of 6 dB/m at 976 nm and 2 dB/m at 920 nm, but only 0.1 dB/m at 1030 nm. It would therefore be possible to pump this fiber efficiently at 920 nm or 976 nm, but not at 1030 nm.

If one wished to design an optical amplifier requiring several watts of single-mode pump power at a wavelength of 1030 nm, suitable semiconductor laser sources are not presently available to provide this function, and may not be developed by the industry for the foreseeable future. Furthermore, even if an alternative pump source were available, such as a fiber laser, suitable WDM couplers—the devices used to combine the pump light into the same fiber as the signal light—with several watts of power handling capability are expensive to produce.

FIG. 1 is a simplified schematic diagram of an amplifier with integrated pump laser according to an embodiment of the present invention. FIG. 1 illustrates a fiber amplifier 40 including a gain section 41 and a pump section 42. The gain section 41 comprises a length of rare-earth doped single-mode fiber 43. The pump section comprises a length of rare-earth doped single-mode fiber 44, a beam combiner 45, an external pump 46, and two reflective structures 47a and 47b. In the illustrated embodiment, the pump section includes a fiber laser generating laser light at an internal pumping wavelength. That portion of the lasing output of the pump section that is transmitted through reflective structures 47b is coupled directly into the gain section 41. A low energy input optical pulse train 48 is substantially amplified by the optical amplifier 40 to become a high energy output optical pulse train 49. In one embodiment, the signal light is injected into the amplifier through the pump section 42, thereby obviating the need for a separate combiner.

In a specific embodiment, the fiber amplifier described in FIG. 1 includes a rare-earth doped single-clad single-mode fiber 43, a rare-earth doped double-clad single-mode fiber 44, a multi-mode beam combiner 45, a multi-mode semiconductor pump laser 46, and FBGs 47a and 47b. The reflectance of FBG 47a is relatively high at the internal pumping wavelength (e.g., 95%), and the reflectance of FBG 47b is relatively low at the internal pumping wavelength (e.g., 5%). The reflectances of both FBGs 47a and 47b are extremely low at the signal wavelengths (e.g., 0.1%). In one embodiment, the pump section 42 can provide several tens (or even hundreds) of watts of single-mode pump power in a predetermined wavelength band and can launch it into the gain section 41 without the need of any complex and costly high power combiners.

In a particular embodiment, the optical fiber has a core size and a numerical aperture (NA) of, for example, about 6 micrometers (μm) in diameter and 0.15 NA, respectively, thereby supporting only a single mode. However in other embodiments, depending on the application at hand, it is useful to use larger core sizes, for example, about 30 μm in diameter with 0.07 NA, for higher energy storage to generate higher pulse energies. For these larger core sizes, several optical modes can usually propagate. It is generally preferable, for several applications, to maintain the propagation of only a single fundamental in the fiber and to minimize optical power present in higher order modes. In order to achieve these goals, several techniques are provided herein. For example, one technique is to coil the fiber in diameters of about 8 to 10 cm, which is sufficient to induce high propagation loss for some higher order modes and thereby to prevent the appearance of higher order modes in, for instance, a 30 μm core fiber, and to maintain only the fundamental mode. A technique such as coiling effectively renders a 30 μm multimode core fiber as a single mode fiber despite the diameter of the core that is usually associated with multimode fibers. Therefore, in embodiments of the present invention, such configurations are included within the definition of a single-mode fiber.

According to some embodiments of the present invention, the loss seen by the input signal 48 as it propagates through the pump section 42, is designed to be relatively low, compared to the gain seen by the signal as it propagates through the gain section 41. Those skilled in the art will recognize that this feature will be readily met, and that in many cases the pump section will actually provide some additional gain rather than loss.

We now describe a particular embodiment of the invention, and for clarity make reference once more to FIG. 1. In this particular embodiment, both the rare-earth doped single-mode fiber 43 and the rare-earth doped single-mode fiber 44 comprise a Ytterbium doped double-clad single-mode fiber having a core diameter of 30 μm, a cladding diameter of 250 μm, and a doping concentration of $3 \times 10^{25}$ ions/m$^3$. Fiber 43 is 3 m long, and fiber 44 is 10 m long. The multi-mode semiconductor pump laser 46 comprises a 8 W pump source having a peak wavelength of 975 nm and a spectral width of 5 nm. FBGs 47a and 47b have peak reflectances of 90% and 10% respectively, in both cases at 1030 nm wavelength with 0.5 nm bandwidth. The pump section 42 produces an output of 5 W of pump power at 1030 nm, which is launched into the gain section 41. The wavelength of the input optical pulse train 48 is 1064 nm. The gain seen by pulse train 48 as it propagates through the pump stage is ~9 dB, and as it propagates through the gain stage is 21 dB, for a total amplifier gain of 30 dB.

Referring once more to FIG. 1, the pump section 42 provides for a very efficient brightness converter, converting high power multimode pump light generated by 46 into a fiber core pump light at an internal pump wavelength, which in turn optically pumps the amplifier section 41. Moreover, by choosing the peak wavelength of reflective structures 47a and 47b according to the application, new pump wavelengths, not easily achievable with semiconductor lasers, can be obtained. This high power pump light now propagating in the core of rare-earth-doped fiber 43 can very efficiently clamp the gain at the pump wavelength to minimize any lasing instability. Furthermore, generally, high power pump light cannot be easily injected in the core of a fiber amplifier simultaneously with signal light due to the lack of an available pump combiner that can sustain such high optical powers. Embodiments of the present invention provide this capability by allowing the signal to propagate through the pump section as well as the amplifier section.

Those skilled in the art will recognize that although fiber 43 is a double-clad fiber, it is in fact being core-pumped by the pump stage, which increases considerably the pumping efficiency. The choice of identical fiber designs for fibers 43 and 44 makes for considerable manufacturing simplicity. Those skilled in the art will also recognize than any residual pump power ejected from the end of fiber 44 will propagate directly into fiber 43, which will also be pumped by it, making for a highly efficient design.

Referring to FIG. 1, by choosing identical fibers for 43 and 44, the amplifier manufacturing process can be considerably simplified. For example, one can use a single length of double-clad fiber to achieve high power operation and fabricate Fiber-Bragg Gratings (FBG) 47a and 47b.

Figure 2:
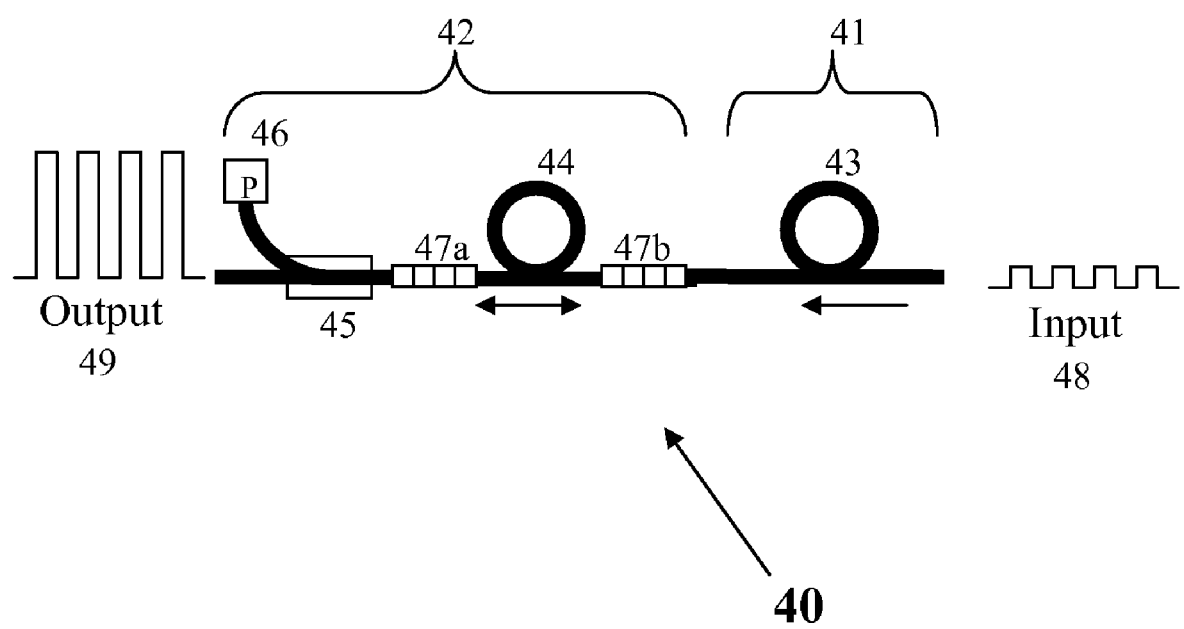
FIG. 2 is a simplified schematic diagram of an amplifier with integrated pump laser according to another embodiment of the present invention.

FIG. 2 is a simplified schematic diagram of an amplifier with integrated pump laser according to another embodiment of the present invention. The embodiment illustrated in FIG. 2 shares some features in common with the embodiment illustrated in FIG. 1. Accordingly, some components are referred to using the same reference numbers. Referring to FIG. 2, the input signal 48 to be amplified is counter-propagated with reference to the pump light. This counter-propagation contrasts with the single direction propagation illustrated in FIG. 1. As a result, the input signal 48 first propagates in the amplifier section 41 and then in the fiber laser section 42.

Figure 3:
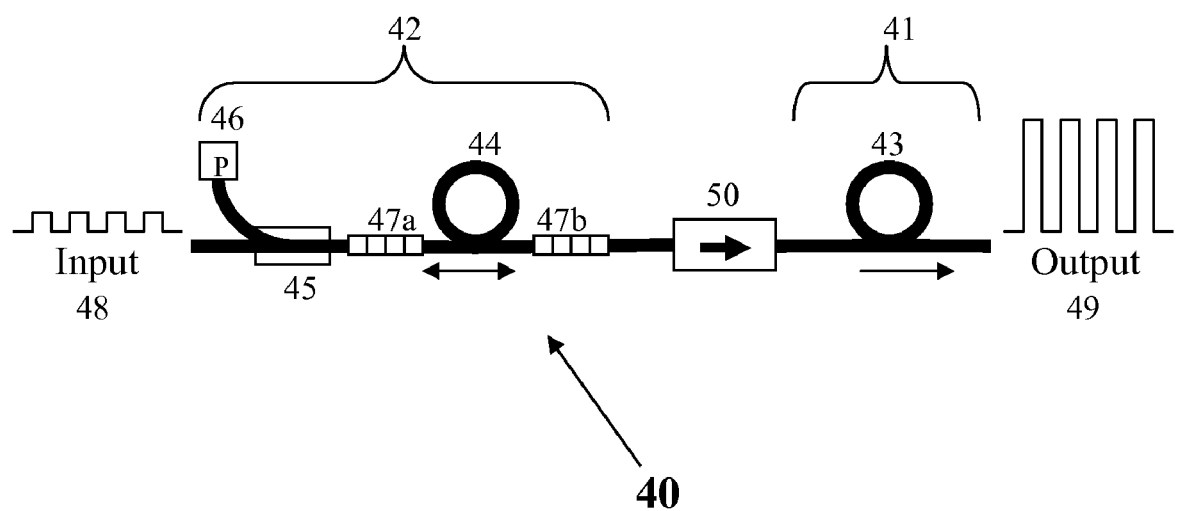
FIG. 3 is a simplified schematic diagram of an amplifier with integrated pump laser according to yet another embodiment of the present invention.

FIG. 3 is a simplified schematic diagram of an amplifier with integrated pump laser according to yet another embodiment of the present invention. The embodiment illustrated in FIG. 3 shares some features in common with the embodiment illustrated in FIG. 1. Accordingly, some components are referred to using the same reference numbers. In the embodiment illustrated in FIG. 3, an optical isolator 50 is inserted between the fiber laser section 42 and the amplifier section 41. The optical isolator 50 prevents light from the amplifier section 41 being injected in the fiber laser section 42. In some embodiments, optical isolator 50 further comprises optical filters to prevent light at specific wavelengths from being injected in either the fiber laser section 42 or the amplifier section 41.

Methods and systems provided herein may be used for amplifying laser pulses to provide high-power laser pulses for industrial applications such as trimming, marking, cutting, and welding. Merely by way of example, some embodiments utilize Ytterbium-doped fiber laser amplifiers. In other embodiments, other active materials and sources are used.

One of ordinary skill in the art would recognize many variations, modifications, and alternatives.

While the present invention has been described with respect to particular embodiments and specific examples thereof, it should be understood that other embodiments may fall within the spirit and scope of the invention. The scope of the invention should, therefore, be determined with reference to the appended claims along with their full scope of equivalents.

What is claimed is:

1. An optical system adapted to amplify an input signal, the optical system comprising:
   an optical pump supporting the input signal and generating an optical pump beam, the optical pump comprising:
      an input port;
      a first active medium coupled to the input port; and
      a pump output end coupled to the first active medium; and
   an optical amplifier comprising:
      an amplifier input end optically coupled to the pump output end and adapted to receive the optical pump beam and the input signal after the input signal passes through the optical pump;
      a second active medium coupled to the amplifier input end and pumped by the optical pump beam; and
      an amplifier output end adapted to output the amplified input signal.

2. The optical system of claim 1 further comprising a beam combiner coupled to a signal input port and coupled to a pump input port, wherein the signal input port is adapted to receive the input signal.

3. The optical system of claim 1 wherein the first active medium comprises a rare-earth doped optical fiber.

4. The optical system of claim 3 wherein the rare-earth doped optical fiber includes at least one of Ytterbium, Erbium, Thulium, Holmium, Praseodymium, or Neodymium.

5. The optical system of claim 3 wherein the rare-earth doped optical fiber comprises at least one of a single-clad fiber, a double-clad fiber, or a multi-clad fiber.

6. The optical system of claim 1 wherein the second active medium comprises a rare-earth doped optical fiber.

7. The optical system of claim 6 wherein the rare-earth doped optical fiber includes at least one of Ytterbium, Erbium, Thulium, Holmium, Praseodymium, or Neodymium.

8. The optical system of claim 7 wherein the rare-earth doped optical fiber comprises at least one of a single-clad fiber, a double-clad fiber, or a multi-clad fiber.

9. The optical system of claim 1 wherein the first active medium comprises a first rare-earth doped optical fiber and the second active medium comprises a second rare-earth doped optical fiber.

10. The optical system of claim 9 wherein the first rare-earth doped optical fiber and the second rare-earth doped optical fiber are different.

11. The optical system of claim 1 further comprising at least a second optical pump coupled to the optical pump.

12. The optical system of claim 1 further comprising an optical isolator coupled to the pump output and the amplifier input.

13. The optical system of claim 1 wherein the optical pump further comprises:
   a first reflective structure coupled to the pump input and the first active medium; and
   a second reflective structure coupled to the first active medium and the pump output.

14. The optical system of claim 13 wherein:
   the first reflective structure is characterized by a first reflectance value at a pump wavelength; and
   the second reflective structure is characterized by a second reflectance value at the pump wavelength, wherein the first reflectance value is greater than the second reflectance value.

15. A method of amplifying an input signal, the method comprising:
   providing an input signal at a signal wavelength;
   providing an external pump beam at a first pump wavelength;
   coupling the input signal and the external pump beam to an input port of an optical pump;
   passing the input signal through the optical pump;
   generating, in the optical pump, a second pump beam at a second pump wavelength;
   coupling the passed input signal and the second pump beam to an input port of an optical amplifier;
   pumping the optical amplifier using the second pump beam; and
   amplifying the passed input signal using the optical amplifier.

16. The method of claim 15 wherein passing the input signal comprises amplifying the input signal.

17. The method of claim 15 wherein the input signal wavelength comprises radiation at about 1064 nm.

18. The method of claim 15 wherein the first pump wavelength comprises radiation in the range of 910 nm to 980 nm.

19. The method of claim 15 wherein the second pump wavelength is in the range of 1020 nm to 1040 nm.

20. The method of claim 15 wherein the optical pump comprises one or more rare-earth-doped optical fibers.

21. The method of claim 15 wherein the optical amplifier comprises one or more rare-earth-doped optical fibers.

22. The method of claim 21 wherein the one or more rare-earth-doped optical fiber comprise at least one of Ytterbium, Erbium, Thulium, Holmium, Praseodymium, or Neodymium.

23. The method of claim 21 wherein the one or more rare-earth-doped optical fiber comprise at least one of a single-clad fiber, a double-clad fiber, or a multi-clad fiber.

24. The method of claim 15 wherein the optical pump further comprises optical reflective elements.

25. The method of claim 24 wherein the optical reflective elements comprise one or more Fiber-Bragg Gratings.

* * * * *